March 28, 1950

F. C. HUYSER 2,502,009

LOAD INDICATING AND CONTROL APPARATUS
FOR TESTING MACHINES

Filed Aug. 21, 1944

*INVENTOR.*
FRANCIS C. HUYSER

BY Bruno C. Lechler

ATTORNEY

March 28, 1950

F. C. HUYSER 2,502,009

LOAD INDICATING AND CONTROL APPARATUS
FOR TESTING MACHINES

Filed Aug. 21, 1944

INVENTOR.
FRANCIS C. HUYSER

BY Bruno C. Lechler

ATTORNEY

March 28, 1950     F. C. HUYSER     2,502,009
LOAD INDICATING AND CONTROL APPARATUS
FOR TESTING MACHINES Filed Aug. 21, 1944     4 Sheets-Sheet 4

*INVENTOR.*
FRANCIS C. HUYSER
BY
*Bruno C. Lechler*
ATTORNEY

Patented Mar. 28, 1950

2,502,009

UNITED STATES PATENT OFFICE 2,502,009

LOAD INDICATING AND CONTROL APPARATUS FOR TESTING MACHINES

Francis C. Huyser, East Moline, Ill., assignor to American Machine and Metals, Inc., New York, N. Y., a corporation of Delaware Application August 21, 1944, Serial No. 550,346

32 Claims. (Cl. 73—90)

This invention relates to machines having a scale beam, and in particular to testing machines having a load-indicating system which includes a scale beam.

More specifically, one aspect of the invention relates to testing machines having a scale beam with means for automatically moving the poise in conformity with the varying stress exerted upon a specimen being tested.

It has long been proposed to automatically balance scale beams by providing poise-moving mechanism set into operation by the swing of the scale beam from its balanced position. While such devices have achieved some success in automatic weighing scales they have been unsuited to the operation of testing machines. In an automatic weighing machine the load is read after the poise comes to rest and there is no occasion to read the scale while the poise is in movement. In contrast however, in a testing machine, the load is continuously varying from the inception of the test to the rupture of the specimen and the load must be determined at a particular instant while the poise is in motion. To make an automatic poise-moving mechanism applicable to a testing machine it is necessary to provide facilities that will move the poise at the same rate that the load is changing so that at each instant the reading indicated by the position of the poise on the scale beam will be indicative of the load on the specimen. This requires a poise-moving mechanism having a range of speed extending up to the most rapid rise in load met in the operation of the testing machine. Such poise-moving mechanisms have not been available.

In a testing machine further difficulty is experienced in securing the desired sensitivity of the machine because the mechanism connected with the scale beam that initiates movement of the poise mover should not exert upon the scale beam a pressure great enough to appreciably affect the free oscillation of the scale beam, yet must control the flow of substantial power to the poise mover to secure rapid balancing. Whether the poise-moving mechanism be electric, hydraulic or mechanical, a servo mechanism whereby a small pilot control actuates the main control becomes necessary for a testing machine. A testing machine may have a range up to 300,000#, and that same machine may be used for measuring smaller loads of 1000# or less. Weighing machines are not called upon to provide the same accuracy or the same range, so the servo mechansim is of less importance in them.

Another difficulty met in the design of an automatic poise-moving mechanism adapted to a testing machine results from the inertia of the scale beam. The inertia of the scale beam is large in comparison to the forces tending to balance or unbalance the scale beam and the natural period of oscillation of the scale beam is long. If the scale beam becomes unbalanced and the poise is moved slowly, there is no great difficulty in getting the scale beam back into balanced position without excessive hunting. As already pointed out, if the poise is to indicate the load instantaneously the poise must be moved at a variable rate and sometimes at a relatively rapid rate. Under those conditions an appreciable length of time will elapse after the poise has reached the balancing position until the scale beam will have swung back to its balanced position. During this interval, while the pendulum is slowly swinging back to balanced position, the poise-moving mechanism is still engaged and this causes the poise to seriously overshoot its proper position. Not only is the wrong indication thus given by the poise, but the overbalanced scale beam will swing past the balancing position with considerable inertia, starting the poise moving back when it again will overshoot the mark. Thus serious hunting will result which cannot be damped in the ordinary way by providing frictional resistance to the free movement of the beam.

The invention provides means which leave the scale beam unrestrained over a narrow range but, after that range is exceeded, the swing of the beam is limited by resilient means. These novel means further provide for starting the beam back toward its balanced position before the poise has reached its balanced position. Thereby the time between the arrival of the poise and the scale beam at their respective balanced positions is so shortened that hunting is almost eliminated.

Since a testing machine may be used for long periods on a particular project utilizing only a portion of its range it is desirable to provide the machine with two scales so that the same poise will balance a given load either by moving over a short distance or a long distance on the scale. This has been accomplished in the past by changing one or more of the fulcrums in the mechanism. It is desirable however to be able to make the change during the progress of a test without thereby changing the rate of application to the specimen. This is here accomplished by a method permitting the gradual shift from one knife edge to another.

It is an object of the invention to provide a poise-moving mechanism for a scale beam which will move the poise automatically at a speed increasing with the degree of unbalance of the scale beam.

It is another object of the invention to provide poise-moving mechanism for a scale beam which will maintain the scale beam in substantial balance with the load applied thereto, permitting the reading of a varying load at any particular instant.

It is another object of the invention to provide a poise-moving mechanism for a scale beam which will limit the amplitude of the swing of the scale beam by moving the poise so rapidly as the swing increases slightly that the unbalancing forces act upon the scale beam during only a small part of the normal period of oscillation of the scale beam.

It is another object of the invention to provide a self-balancing system including a scale beam wherein the scale beam has a limited range of free oscillation.

It is a further object of the invention to provide a self-balancing system including a scale beam wherein the scale beam has a limited range of free motion and thereafter encounters resilient restraint which will shorten the period of oscillation of the beam when swinging over a wide range.

It is a further object of the invention to provide a self-balancing system including a scale beam wherein the oscillation of the scale beam initiates an automatic poise-moving mechanism wherein forces built up by the swing of the scale beam beyond a short free-balancing range will assist the poise in starting the scale beam to swing back toward the balanced position in advance of the arrival of the poise at the balanced position in the scale.

It is a further object of the invention to provide a self-balancing system wherein a lever loaded in proportion to the force being measured reacts against the scale beam at any one of several optional points, permitting a choice of scale ranges.

It is a further object of the invention to provide a self-balancing system wherein a lever loaded in proportion to the force being measured reacts against the scale beam at any one of several optional points, and means are provided for gradually transferring the reaction from one point to another during the progress of the load-measuring operation.

It is an object of this invention to provide a self-balancing system wherein a poise is moved along a scale beam by a hydraulic motor whose movement is controlled by the position of the scale beam relative to its balanced position.

It is a further object of this invention to provide a self-balancing system wherein a poise is moved along a scale beam by a hydraulic motor whose movement is controlled by a control valve which in turn is controlled by a pilot valve.

It is a further object of the invention to provide a self-balancing system wherein a poise is moved along the scale beam by a hydraulic motor wherein high sensitivity is secured by using a pilot valve of small size actuated by the scale beam to control the control valve for the hydraulic motor and further reducing the restraint imposed upon the scale beam by the pilot valve by keeping the pilot valve piston in movement relative to its valve body.

It is a further object of the invention to provide a self-balancing system having a poise that is moved along a scale beam by a hydraulic motor governed by a pilot valve of small size actuated by the scale beam to operate the hydraulic motor control valve whereas the restraint imposed upon the scale beam by the pilot valve is further reduced by oscillating the pilot valve piston in the valve body.

It is a further object of the invention to provide a self-balancing system having a poise that is moved along a scale beam by a hydraulic motor wherein movement of the scale beam opens a pilot valve which controls the degree of opening of the control valve, the pilot valve being automatically closed when the control valve has opened to an extent which is relative to the distance the scale beam has moved from its balanced position, thereby determining the rate at which the hydraulic motor moves the poise.

It is a further object of the invention to provide a self-balancing system having a poise that is moved along a scale beam by a hydraulic motor wherein movement of the scale beam opens a pilot valve which controls the degree of opening of the control valve that is automatically closed when the control valve has opened to an extent which is related to the distance the scale beam has moved from its balanced position, thereby determining the rate at which the hydraulic motor moves the poise wherein the free amplitude of the scale beam is limited and resilient means become effective beyond the range to limit the excessive movement of the valve.

Another object of the invention is to provide a testing machine of the kind just described wherein if the load is applied to the specimen at a rapid rate, the poise will be moved towards its balancing position at a rapid rate, whereas, if the load is applied at a slow rate, the poise will also move slowly.

A further object of the invention is to provide in a testing machine having a load indicating system of the scale-beam type buffer means for limiting the swing of the beam which are capable of offering a rapidly increasing resistance as the force tending to unbalance the scale beam increases.

It is a further object of the invention to reduce the amplitude of the oscillations of the scale beam so radically that even for relatively great unbalancing forces the motion of the beam remains almost imperceptible, thus largely eliminating the effect of the inertia of the beam.

Still another object of the invention is to provide in a testing machine having a load-indicating system of the scale-beam type a wide range of different travel speeds for the poise in spite of the fact that the oscillations of the scale beam are radically damped.

Other objects and advantages of the invention will appear as the description proceeds, reference being had to the accompanying drawings in which:

Fig. 7 is a fragmentary section on line 7—7 of Fig. 2 showing a vibrating mechanism.

A denotes generally a testing machine using a scale beam. While the invention is not limited to any particular form of testing machines of the scale-beam type, but may be used in connection with any such testing machine, regardless of whether the load is applied mechanically, hydraulically, or in any other manner, I have selected for illustrative purposes two types of testing machines shown, respectively, in Figs. 1 and 3. Of these two figures, Fig. 1 is illustrative of that type of testing machines in which the load is measured by the reaction of the specimen against a weighing system generally indicated at B, whereas Fig. 3 is illustrative of the type of testing machines in which the load is applied hydraulically and measured by the pressure of the liquid under the pressure-applying ram.

C indicates a scale beam having a poise and hydraulic means for moving the poise automatically to a position where the beam balances.

Figure 1:
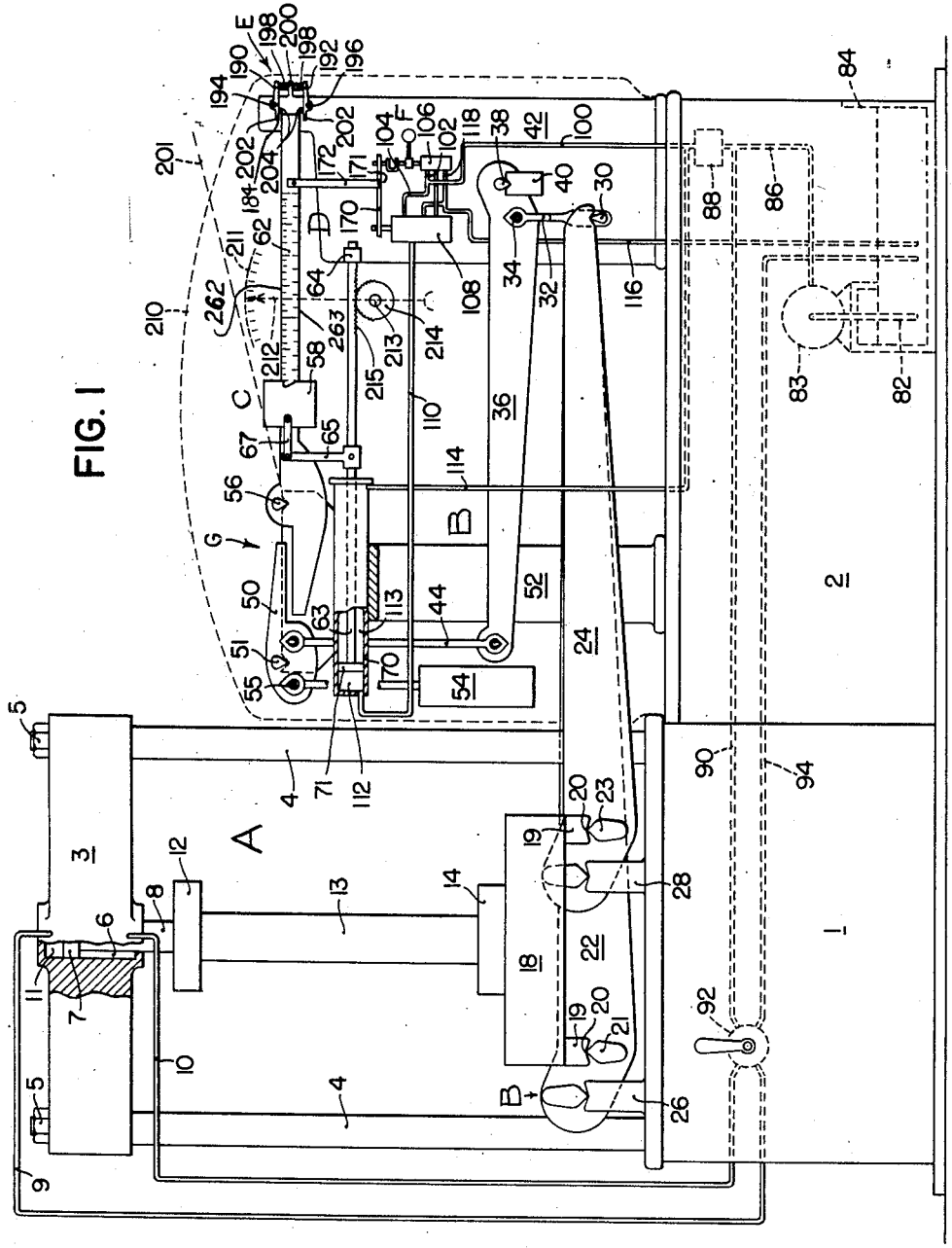
Fig. 1 is a front elevation, partly in section, of a testing machine embodying the invention.
Figure 2:
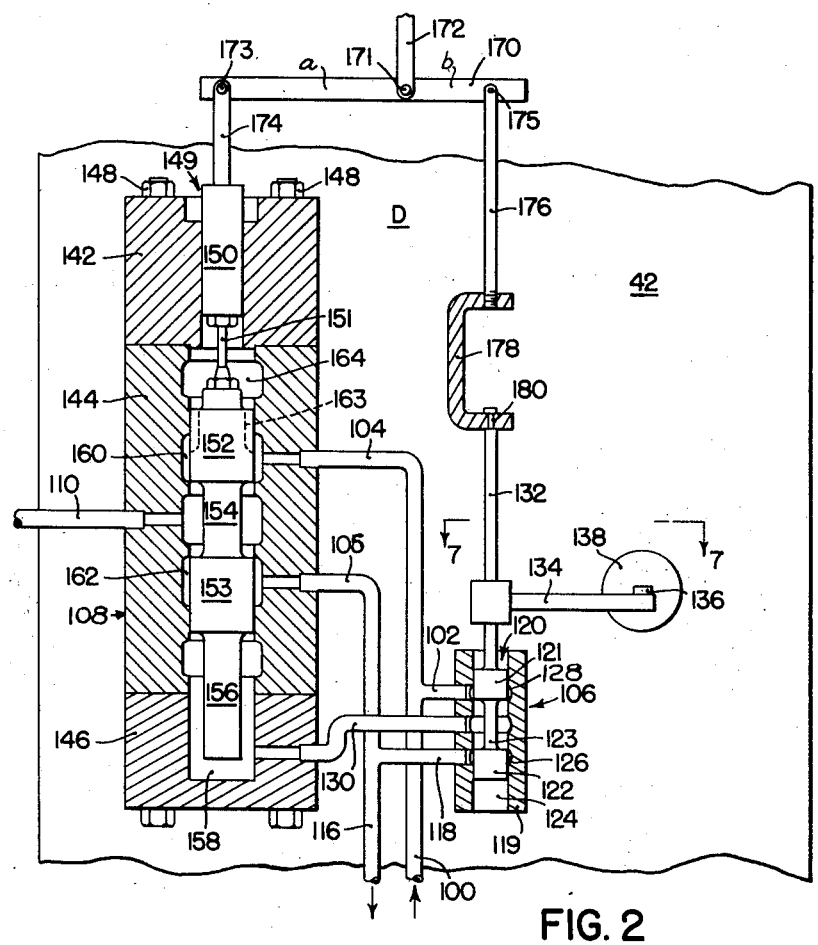
Fig. 2 is a section, drawn to a larger scale, of an automatic valve mechanism shown in Fig. 1.
Figure 3:
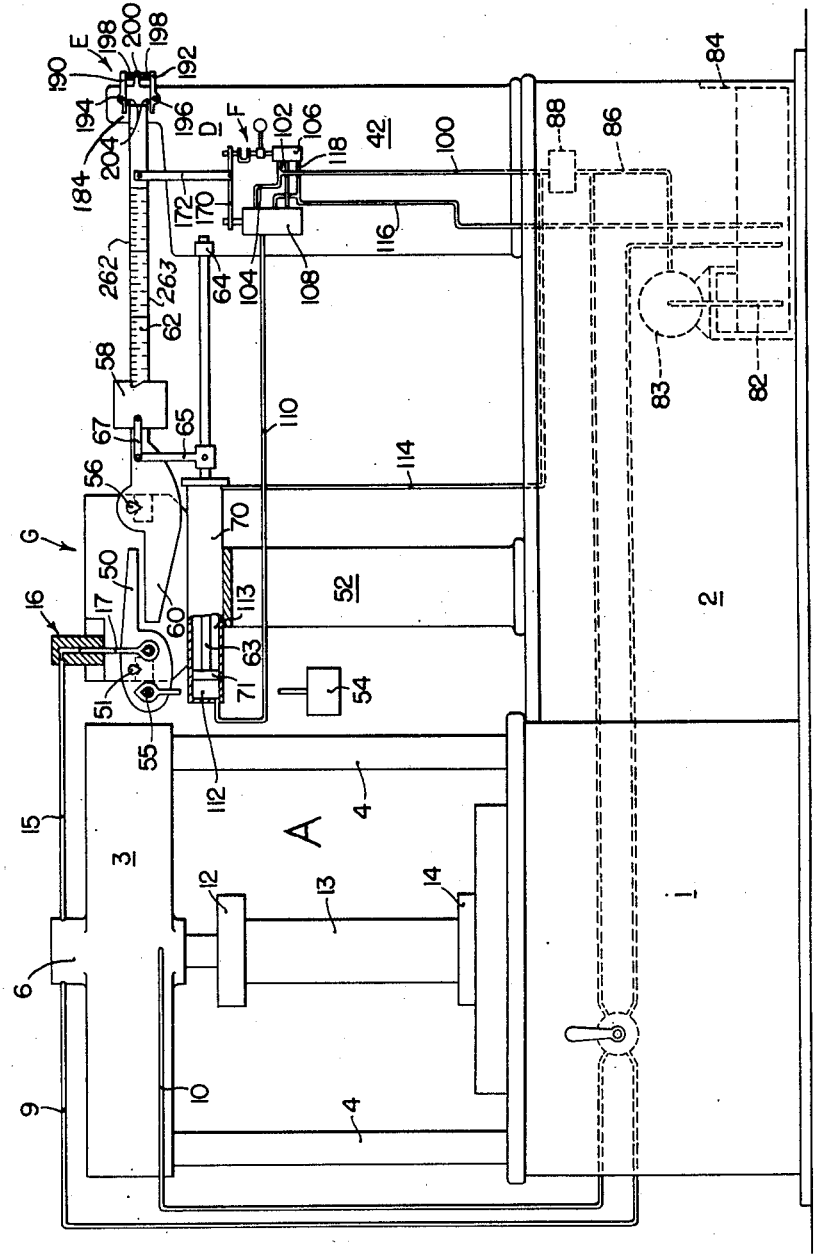
Figure 3 is a similar view of another form of a testing machine embodying the invention.
Figure 4:
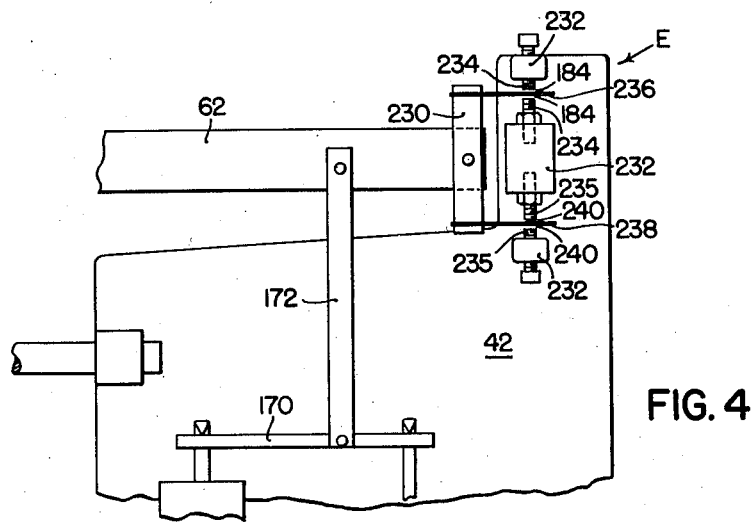
Fig. 4 is a fragmentary view of a mechanism for checking the oscillations of the scale beam.

D, shown in outline in Figs. 1, 3 and 4, and in detail in Fig. 2, indicates an automatic valve mechanism designed to move the poise at a variable rate dependent upon the degree of unbalance present when the scale beam has been thrown out of balance by a change in the load applied to the specimen in a testing machine.

E represents means for limiting the range of oscillation of the scale beam. Two forms of such limiting means are shown; one in Figs. 1 and 3, and the other in Fig. 4.

F represents means for securing high sensitivity of the scale by decreasing the resistance of the automatic valve mechanism to movement. This is accomplished by oscillating a pilot valve forming part of this valve mechanism in its housing.

Figure 5:
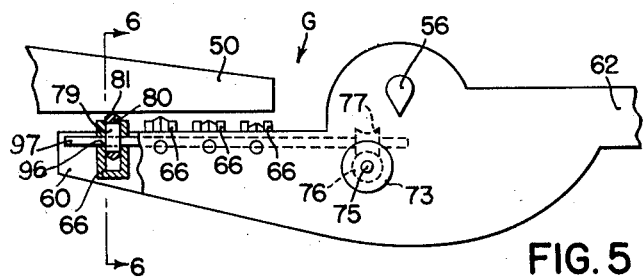
Fig. 5 is an enlarged view, partly in section, of a portion of the scale beam shown in Figs. 1 and 3.
Figure 6:
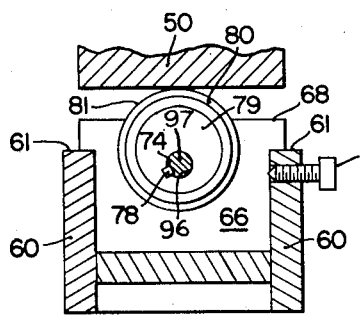
Fig. 6 is a section on line 6—6 of Fig. 5.

G denotes a scale selecting mechanism shown in greater detail in Figs. 5 and 6. This mechanism permits establishing various scale ranges any one of which the operator can select. The scale beam is graduated in conventional manner so that the position of the poise on the beam can be read. Each interval of one scale on the beam may have different values depending on the position of the scale selecting mechanism or several scales may be marked side by side on the scale beam and the poise position read off directly on the appropriate scale in terms of load on the specimen. Thus, when tests are to be performed that are known to involve only small loads, a relatively great effective length of the scale beam may be used assuring that the indications are of great accuracy which can be read easily, whereas other scale ranges may be selected when the same testing machine is to be used in making tests involving higher loads.

The invention can be applied to the automatic balancing of any scale beam, or to the measurement of any quantity by a testing machine, where the load on the scale beam varies with the changes in that quantity. Thus the invention may be applied to the measurement of a force, of a torque, compression or tension. Although equally applicable to a testing machine designed to measure bending, compression, tension or torsion, the invention is here illustrated in the application to a compression testing machine such as is used in making tests on concrete blocks or cylinders.

The testing machine shown has a base 1 with an extension 2, the latter carrying the load indicating mechanism. Supported on the base 1 by columns 4 is a head 3. The columns 4 may be rods which extend through the head 3 and are engaged by nuts 5. The head 3 contains a cylinder 6 within which is a ram or piston 7 that exerts the pressure on the specimen. This piston has a stem 8 of reduced cross-section. Conduits 9 and 10 are provided to supply a pressure fluid, such as oil, to the top and the bottom of the ram 7. The function of conduit 10 is solely to return the ram 7 to its initial raised position when the pressure fluid is withdrawn through conduit 9 from the upper portion 11 of the cylinder 6, relieving the upper side of the ram 7 from fluid pressure. If desired, the conduit 10 may be eliminated and a ram of uniform cross-section may be used together with a spring or other device that will return the piston to its upper position. When pressure is applied to a specimen 13, oil is forced into space 11, the ram moves downwardly, carrying with it a platen 12 which presses upon the specimen. The specimen is supported on a lower platen 14.

In the arrangement shown in Fig. 1 the load applied to the specimen 13 is determined by measuring the pressure which the specimen exerts upon the lower platen 14. This pressure is transmitted to a table 18 which may be supported in such a manner that, regardless of where on the table the load is applied, the pull on link 32 will be the same. Thus it may be carried in conventional manner on four feet 19 having V-shaped grooves 20. The load is transmitted through these V-shaped grooves onto knife edges 21 and 23. The knife edges 21 are carried by a lever 22 and the knife edges 23 by another lever 24. Lever 22 is supported at one end on a column 26 carried by the base 1 and bears with its other end upon a knife edge 30. The lever 24 is supported at one end on another column 28 carried by the base 1. Its other end transmits its load to the same knife edge 30 upon which the lever 22 bears. Both levers 22, 24 have the same lever ratio; that is to say, a certain load applied directly above the knife edge 21 will give the same reaction on knife edge 30 as will be obtained therefrom the same load if placed directly over knife edge 23.

Thus the pull on link 32 is proportional to, but only a fraction of, the total load imposed on the specimen and transmitted through the specimen to the table. To further reduce the forces acting upon the indicating mechanism of the testing machine, another lever 36 having unequal arms is interposed between the load and the scale beam. The connector 32 acts upon knife edges 34 carried by the lever 36 which is supported on knife edges 38. These knife edges 38 react against supports 40 carried by a post 42 which rises up from the base 2. The lever 36 thus transmits to a vertical rod 44 a load which is much smaller in magnitude than the load on the specimen, but is directly proportional thereto.

50 is a lever supported by knife edges 61 on a column 52 carried by the base extension 2. It is to this lever 50 that the load just mentioned is transmitted through the rod 44 in the form of testing machine shown in Fig. 1. Thus a moment is created in lever 50 which is directly proportional to the load on the specimen. This moment tends to rotate this lever in a clockwise direction. A counterweight 54 is hung from the lever 50 by a knife edge 55. The function of this counterweight is to balance the weights of various beams and levers themselves so that when no load is applied to the specimen the lever 50 will come to rest in a balanced position. When a load is applied to a specimen in the testing machine the lever 50 exerts a pressure on the left hand end 60 of the main scale beam 62 through a scale selecting mechanism which will be described later. The scale beam is supported at 56 upon the post 52 previously mentioned. The scale beam 62 carries a poise 58 which may be moved to balance the pressure applied to the scale beam by the lever 50. A number of scales 262, 263 on the scale beam 62 permit the position of the poise to be read on whichever scale has been chosen by the scale-selecting mechanism.

Instead of transmitting pressure on lever 50 by means of the rod 44 actuated by the weighing system just described in connection with Fig. 1 the pressure may be transmitted to lever 50 by a hydraulic system including plunger 17, as shown in Fig. 3. The plunger is movable in a cylinder 16 which communicates through a conduit 15 with the space 11 above the ram 7 in cylinder 6. The plunger 17 has a small diameter as compared with the diameter of the ram 7 so that the pressure exerted by plunger 17 upon the lever 50 is only a fraction, but proportional to, the pressure which the ram 7 exerts upon the specimen 13 through the platen 12. To maintain the load on the specimen and the pressure on the plunger 17 in a fixed ratio it is necessary to provide for frictionless movement of the ram 7 and the plunger 17 in their cylinders. This may readily be accomplished by lapping the ram and plunger so that no appreciable quantity of oil will pass either of them, even though no packings or rings are used.

The load balancing mechanism includes a cylinder 70 which may be supported on post 52. This cylinder contains a piston 71 carried by a piston rod 63, the end of the piston rod moving in a bearing 64 carried by the post 42. The space in the cylinder to the left of the piston 71 is denoted as 112 and the space to the right of that piston 113. Keyed to the piston rod 63 is an arm 65 which is connected to the poise 58 by means of a link 67. The pivotal connections of the link 67 are situated in the same plane as the knife edge which supports the scale beam 62 at 56 and the center of gravity of the poise. Therefore, when the poise 58 is moved longitudinally of the scale beam 62 by the cylinder there is no tendency to disturb the balance of the scale beam.

The piston 71 may be moved in the cylinder 70 by oil under pressure which may be supplied by a motor-driven pump diagrammatically indicated at 83 which draws oil through a pipe 82 from a sump 84. Oil under pressure is delivered by pump 83 into conduit 86. This connects with conduit 90 that leads to a means to control the rate of flow, generally indicated by a hand controlled valve 92 and to a pressure reducer 88. The valve 92 may be arranged so that oil under pressure can be supplied at will either to conduit 9 to push the ram 7 with the platen 12 down on the specimen 13 or to the conduit 10 in order to raise the ram 7. In either case the oil from the opposite side of the ram 7 may flow back through a conduit 94 to the sump 84. Since the pressure in line 90 may vary with the resistance encountered by the ram 7, the oil used to move ram 71 passes through the pressure reducer at 88, thereby assuring uniform operation at a constant pressure.

The oil passing through the pressure regulator 88 is carried by a conduit 100 branching into conduits 102 and 104 to a pilot valve 106 and a control valve 108. These valves, which will be more fully described below, control the flow of oil through conduit 110 to and from the space 112 at the left hand side of the piston 71. Oil under pressure may also be supplied through conduit 114 to the space 113 at the right hand side of the piston 71. This exerts a constant pressure tending to drive this piston toward the left hand position shown. As the left hand face of the piston is larger than the right hand face, when oil is supplied through conduit 110, the piston 71 will move against the pressure in space 113. The control valve 108 is arranged to feed oil under pressure received through conduit 104 into conduit 110 when the poise is to be moved toward the right. When it is desired to move the poise 58 back to the left the control valve is arranged to draw oil out through conduit 105 which leads back to the sump 84.

The control valve is governed by pilot valve 106. Referring now to Fig. 2, the pilot valve 106 comprises a cylindrical housing 119 in which a valve piston 120 is vertically movable. The valve piston 120 consists of two sections 121, 122 joined by a stem 123. Oil under pressure is supplied through conduit 102 to an annular space 128 within the housing 119 and oil may be drained from a similar annular groove 126 which connects through conduit 118 with the conduit 116 leading to the sump. In the position of the pilot valve shown, no oil can flow into or out of a conduit 130 which connects the central part of valve 106 to the valve 108. If the valve piston 120 is elevated above the position shown, oil under pressure will flow into conduit 130. If the valve piston is lowered from the position shown, oil will flow out of conduit 130 into the sump 84 through conduits 118 and 116.

The housing of the control valve 108 may be fashioned from several sections 142, 144, 146 held together by through studs whose nuts are visible at 148. These three sections functioning as a single body have bores within which a piston assembly generally indicated at 149 and including a plunger 150 and two valve pistons 152, 153 is movable. A connecting rod 151 connects the plunger 150 with the upper valve piston 152 which in turn is connected by a reduced section 154 with the lower valve piston 153, the latter carrying a lower plunger 156. The space 158 below the plunger 156 is connected through the conduit 130 with the pilot valve 106. 160 and 162 are annular grooves in the housing section 144, the space 160 being connected to conduit 104 and the space 162 to a conduit 105 which communicates with the conduits 116 and 118. Whenever the piston 120 of the pilot valve 106 moves in one direction or the other, fluid flows into or out of space 158 for as long a time as the pilot valve is displaced from its neutral position. Thus the control valve may be displaced from its illustrated position varying amounts in either direction by the pilot valve. In the position shown no oil can flow through line 110 to the cylinder 70 because the annular spaces 160 and 162 which are respectively in connection with the oil under pressure and the sump are cut off by the valve pistons 152 and 153.

If the piston assembly 149 of the control valve 108 moves upwardly, oil flows from space 160 into line 110 at a rate dependent upon the vertical displacement of the valve piston 152 and if it moves downwardly, the oil flows back from line 110 into line 116 at a rate dependent upon the downward displacement of the valve piston 153. The valve piston 152 may have grooves 163 which permit the oil under pressure to pass into a space 164. If the plunger 150 is of smaller diameter than the valve piston 152 there will be a tendency for pushing the valve assembly downwardly, and thereby to drive oil out through line 130 whenever the pilot valve 106 permits this.

The movable parts of the pilot valve 106 and of the control valve 108 are interconnected through a lever 170. This lever is suspended from the scale beam 62 by means of a connector 172 linked to the lever 170 at 171. One end of the lever 170 is connected at 173 with an extension 174 of the plunger 150 of the control valve 108 whereas the other end of this lever is connected at 175 by means of a rod 176 with a yoke 178 which in turn connects to the valve stem 132 of the pilot valve 106. The length of the two arms a, b of the lever 170 may bear any suitable ratio to each other, the arm a being preferably several times longer than the arm b.

If in the position of the parts shown in Fig. 2, in which there is no flow of pressure fluid through conduit 130 and thus the piston assembly of the control valve 108 is holding the pivot 173 of the lever 170 in a fixed position, the scale beam 62 starts to move up or down, the lever 170 will first be tilted about 173 in the corresponding directions. The pilot valve 106 follows the movement of the point 175 of the lever 170 and connects conduit 130 that controls the position of the valve 149 either with oil under pressure through conduit 104 or with the sump through conduit 105. This will cause the control valve to move and the extension 174 will turn the lever 170 about its support 171 causing the valve 106 to be closed.

Depending upon the amplitude of the swing of the scale beam, the control valve 108 will have to move vertically a greater or smaller distance to close the pilot valve 106. When the pilot valve 106 has closed the control valve remains in whatever position it has reached.

Thus when the scale beam swings, there is a tendency to open the pilot valve 106 even for the smallest swing of the scale beam, provided the pilot valve is working with sufficiently low friction to insure a high sensitivity of the system. Practically frictionless movement of the pilot valve 106, which will allow this valve to follow the slightest tendency of the scale beam to rise or fall, can be obtained by taking advantage of the lower friction a running shaft has as compared with that of a static shaft. To maintain running friction in a valve at rest a device may be provided which imparts an oscillating movement to the movable parts of the pilot valve 106. This device, which is best shown in Figs. 2 and 7, comprises an arm 134 one end of which is splined to the stem 132 of the pilot valve 106 and whose other end is connected to an oscillating plunger 136 of an electric solenoid 138. An automatic make and break circuit not shown keeps the plunger oscillating continuously. This solenoid may be supported on column 42 which also supports the pilot valve 106 by means of a bracket 140. As has been mentioned before, the valve stem 132 is connected to the yoke 178. This connection must be such that the stem 132 may be oscillated by the oscillating device just described without oscillating the yoke 178 or the vertical rod 176 connected to lever 170. One such connection, by way of example, is shown here. A headed stud 180 forms the end of the valve stem 132. This stud can revolve freely in an opening in the yoke 178 without interfering with the axial displacement of the yoke 178 by the stem 132.

It will be seen that the combination of the pilot valve, control valve and scale beam in this manner provides a construction which will automatically move the poise 58 at a rapid rate, or at a slow rate, depending upon the degree of unbalance of the scale beam. By this construction I provide ample speed for the poise to follow a high rate of loading the specimen without much hunting.

While the construction just described will balance the scale beam where the load on the specimen is changing without much divergence between the load indicated by the scale reading and the load actually imposed on the specimen, even if the scale beam were to perform a relatively considerable swing, I have found it important to prevent the scale beam from swinging through more than a moderate range for the best results.

If we study the action of the mechanism thus far described, we find that if the scale beam is close to balancing, the vertical movement of the connector 172 will be a small one and it will take only a small movement of the piston assembly 149 of the control valve 108 to close the pilot valve 106. This sets the control valve for a low rate of flow into cylinder 70 and a slow rate of movement of the poise 58. When the load has been balanced, the connector 172 will move in the opposite direction from that in which it moved previously, moving the piston valve 120 of the pilot valve 106 in the opposite direction, and thereby causing the piston assembly 149 of the control valve 108 to move in the opposite direction merely to shut off the flow of oil to the cylinder 70. Thus the piston 71 in the cylinder 70 is held against further movement in the position which corresponds to the balancing position of the poise 58.

Taking another case where if the swing of the beam, while still remaining moderate, is greater than has just been considered, we find that connector 172 will move a greater distance and this in turn will cause the control valve 149 to be moved a greater distance, permitting a larger flow through line 110 and causing a more rapid movement of the poise, so that the beam will again be balanced in proper time.

It will be obvious, however, that if the scale beam 62 were allowed to rise a very considerable distance, say 2″, and the poise 58 were to be moved to the position that will balance the beam, the length of time the scale beam would need, on account of its inertia, to move down to its neutral position would cause a lapse of time during which the poise would continue to move. Not until the beam reaches a level position will the poise stop moving. To avoid such a delay and to secure instead a practically instantaneous reaction of the poise to changes in the load, I provide means which limit the free movement of the scale beam 62 to a small distance.

One form of such swing limiting means is shown in Figs. 1 and 3. In this form two small levers 190, 192 are pivoted at 194 and 196 respectively on the post 42. Compression springs 198 reacting against the end of the levers and a projection 200 on the post tend to turn these levers so that their forward ends 202 will be forced inwardly until they bear against stops 204 on post 42. The stops 204 are so arranged that in its horizontal position the scale beam 62 has small free play before it touches either lever. This play is indicated by spaces 134. These small spaces 184 permit the scale beam to oscillate freely when it approaches its balanced position. If the beam attempts to perform a wide swing, such as when the load is suddenly applied to the specimen, the right end of the scale beam 62 will strike against one of the two fingers 202 and compress one of the springs 198. This prevents the scale beam 62 from going beyond a given maximum amplitude of oscillation even though the poise 58 has not reached the balancing position.

Not only is the inertia time loss thus avoided but the scale beam 62 is pushed back and started in the reverse direction by the end 202 of the respective lever 190 or 192 under the action of a compressed spring 198 as the poise is approaching the balancing point. This gives the scale beam a chance to reach its neutral position and shut off the flow of liquid through conduit 110 promptly as the poise 58 reaches the balancing position before it can substantially overshoot the balancing point. It would necessarily overshoot if the scale beam had swung up a great distance, such as into the position indicated by the dotted line 201 in Fig. 1, and had not started to come back toward the neutral position until the poise had reached the balancing point. In the latter case the flow of oil through line 110 would continue flowing into the cylinder all during the time the large inertia scale beam is swinging back towards its horizontal position. By the time the scale beam would reach this horizontal position the poise would be far beyond its proper position on the beam. With the swing limiting device suggested here the hunting just described is effectively eliminated.

By using this device the motion of the scale beam may be reduced so much that it becomes almost imperceptible, and a very accurate indication of the instantaneous load on the specimen is obtained regardless of the rate of loading.

Another structural form of the swing limiting means is shown in Fig. 4. Here a cross-arm 230 is pinned to the end of the scale beam 62. The post 42 carries a series of bosses 232 serving as mounts for a plurality of pairs of adjustable stops such as 234, 235. The cross arm 230 carries a number of cantilever springs each spring extending between one pair of stops. One of these cantilever springs 236 is relatively light and extends into the gap between stops 234. Each of the other cantilever springs is somewhat stiffer than the spring which preceded it. Thus spring 238 is stiffer than the spring 236 and this spring extends between the two adjustable stops 235. The stops 234 are so set that for a free oscillating movement of the spring 236 similar spaces 184 are left as are provided for in Fig. 1 for the end of the oscillating beam 62 itself. Thus the scale beam 62 can rise or fall slightly above or below its neutral position within the limits determined by the spaces 184 before one of the stops 234 is touched by the light spring 236. If, however, the swing of the beam is great enough to bring the spring 236 in touch with one of the other of the stops 234 and to subject this spring to an increasing flexure, the resistance developed by this spring will tend to slow down and reduce the amplitude of movement of the beam. The stops 235 with which the heavier spring 238 cooperated are set back somewhat further than the stops 234 leaving spaces 240 which are somewhat larger than the spaces 184. Should the tendency of the beam to swing be so great that despite the resistance offered by the light spring 236 the beam does not reverse its direction before the heavier spring 238 reaches that stop 235 which lies in the path of the instantaneous movement of the beam, the spring 238 will come to bear against said stop 235 and also become flexed, offering thereby a much increased resistance to any further movement of the beam in the same direction.

The play afforded by the spaces 184 as well as the spaces 240 may be held as small as a few thousandths of an inch so that the motion of the scale beam may be in a range so small as to be hardly perceptible. Any effect of the inertia of the scale beam is thus largely eliminated. For example, very good results have been achieved with a testing machine having a capacity of 50,000 lbs. in which the spaces 184 were set at .002" and the spaces 240 at approximately .006". In spite of this very limited range of movement of the scale beam 62 the travel speed of the poise 58 varies within a very wide range according to the amplitude of the scale beam displacement. As has been mentioned above, the slightest movement of the scale beam 62, say .001", will open the pilot valve 106 which will then be closed by a responsive movement of the control valve 108, the magnitude of this latter movement being dependent upon the amplitude of said scale beam displacement and also upon the ratio of the arms $a$ and $b$ of the lever 170. If for instance, the scale beam had been out of balance enough to lift or depress the fulcrum 171 of the lever 170 a distance of .008" (which in the example given would correspond to the heavy springs 238 just touching one of the stops 235) and the ratio of the lever arms $a$ and $b$ were 1:5, the valve piston assembly 149 of the control valve 108 would have to move a distance of .048" in order to close the pilot valve 106. For a movement of the scale beam out of its balanced position corresponding to a vertical movement of the point 171 of say .002", the pilot valve again would open fully but the movement of the control valve to close the pilot valve would cover a distance of .012" only and would thereby provide for a much slower movement of the poise 58 as the beam is approaching its neutral position.

The poise itself may indicate the load if the scale beam is graduated as a scale and the position of the poise on this scale beam is noted. However, the entire mechanism carried by the base extension 2 could be arranged within a cabinet 210 as indicated in broken lines in Fig. 1. In that event, a dial 211 may be arranged at the outside of the cabinet 210 over which a pointer 212 may move. This pointer may be carried by a shaft 213 which is actuated by a pinion or gear 214 meshing with a rack 215 that forms part of, or is connected with the piston rod 63.

It will be seen that due to the swing-limiting device described, the oscillation which any free scale beam has to carry out is sharply damped because when the scale beam swings in either direction and exceeds the small limits of free movement provided for by the buffer or buffers, it stresses resilient means so that when the poise approaches the balancing point the scale beam, instead of being at its maximum distance from its neutral position is already moving back toward its neutral position.

In order to provide the machine with several scale ranges, the point at which the load is applied to the scale beam 62 by the lever 50 may be moved to a greater or shorter distance from the scale beam support 56. This point may be conveniently moved by constructing the end 60 of the beam 62 as a forked member, then slidably mounting a number of carriers 66 supporting knife edges between these forked ends. Each of these carriers 66 is supported on lugs 68 adapted to ride upon the upper faces 61 of the forked member 60. This permits any desired longitudinal adjustment of each carrier 66. When the desired position of a particular carrier 66 has been determined, it may be locked in position by a set screw 95 or in any other convenient manner.

It may be convenient to adjust the position of the carriers in such a manner that the varying lengths of the divisions of the scale that the poise must cover to indicate a given load change when using one or the other carrier are simple multiples of each other. Thus, if the carriers which are to be used in connection with scales 262 and 263 are so adjusted that a load which is balanced by moving the poise one division on scale 262 when the one carrier is effective will require moving the poise one division on scale 263 which is exactly equal to two divisions on scale 262 when the other carrier is effective, one set of scale divisions with two sets of numerical values might be used in place of 262 and 263. In that case, the scale on the dial 211 traversed by pointer 212 need have but one set of graduations to permit reading the load according to several scale ranges.

The knife edges are supported on a shaft 97 which extends through holes 96 that are provided in each of these carriers 66. This shaft may be rotated by any suitable means, such as by a knob 73 carried by a shaft 75 extending across the forked end 60 of the scale beam 62. This shaft carries a worm wheel 76 meshing with a worm 77 on the shaft 97.

A key-way 74 extends lengthwise of the shaft 97. Eccentric disks or cams, each carrying a key fitting in key-way 74 of the shaft are supported in the carriers on the shaft 97 in such a way that though their axial position is determined by the position of the carrier, their angular position is determined by the angular position of the shaft. Each eccentric disc carries a hardened steel ring 80 whose outer surface is ground so as to form a knife edge 81 extending around the ring.

The eccentrics or cams 79 are so constructed and arranged on the shaft 97 that their respective portions of maximum eccentricity or radius lie in different radial planes. By turning the knob 73 on the shaft 97 which turns all the eccentrics or cams 79 keyed to said shaft, any desired eccentric or cam 79 may be brought into a position in which its portion of maximum eccentricity extends in the vertical upward direction. This particular eccentric is then in supporting contact with the lower surface of the lever 50 while the other eccentrics are not sufficiently elevated to make contact with the lever 50. Further rotating the knob 73 will turn another of the eccentrics into the position in which it supports the lever 50. Thus it will appear that the turning of the knob 73 will turn another of the eccentrics into the position in which it supports the lever 50. Thus it will appear that the turning of the knob 73 will cause the several knife edges 81 to be successively elevated into contact with lever 50. Depending upon which knife edge is elevated, the effective length of the lever arm 60, as measured from the fulcrum 56, will be larger or smaller. Several scale ranges are thus made available.

The position of each of the carriers 66 determines one scale range. If these scale ranges are to be related to each other such as 1:2, 1:4, 1:5 they may be readily adjusted so that the several scale ranges determined by their position have the desired simple integral relationship. It will be apparent that any other desired ratio may be selected with no other restrictions to the positioning of the carriers 66 than their own thickness. If it is desired to increase still further the number and the variability of the scale ranges, this may be achieved by combining the selecting device just described with a poise 58 whose weight may be changed by placing one or more additional weights in any convenient manner on the movable poise.

After the carriers 66 have been adjusted according to the desired scale ranges, the change from one of these ranges to another can be carried out before the machine is started as well as at any time during the operation of the machine without interruption of the test in progress. Such a change from one scale range to another affects only the indicating system of the machine in the desired manner without reacting in any manner upon the load applied to the specimen. This in contrast to conventional testing machines, such as the pendulum type, where a change from one scale range to another requires a change of the weight of the pendulum arm that cannot be made while the test is in progress without creating undesired stresses in the specimen.

The operation of the machine will readily be understood from the description given. The specimen to be tested 13, is mounted in the machine and the motor driven oil pump 83 is started. This will create a fixed pressure determined by the pressure regulator 88 in conduits 100 and 114. As the scale beam is in balance, both valves 106 and 108 are closed and no oil flows through them. The oil flowing through conduit 114 enters space 113 in the cylinder and pushes the piston 71 to the left, carrying the poise back to a zero reading if not already there.

Load is now applied to the specimen. This is accomplished by admitting oil under pressure at a controlled rate into line 9. The admission of oil into line 9 may be controlled by known automatic means that supply fluid at a constant rate, or supply fluid in a variable quantity to build up the pressure at a constant rate. Such a fluid control apparatus is symbolized by hand valve 92. It is assumed that the valve is opened only partly.

Depending upon the rate at which fluid is admitted into space 11 and the compressibility of the specimen 13, the head 12 will move down slowly with a gradually increasing pressure. In the construction shown in Figure 1 that pressure is transmitted through the table 18 and the linkage described transmits a proportional smaller force to the lever 50.

In the construction shown in Figure 3, the pressure of the oil in space 11 which varies directly with the load applied to the specimen, transmits through line 15 and the small cylinder 16 the same smaller proportional force upon lever 50.

In either event lever 50 will be turned clockwise bearing upon one of the eccentric cams shown in Figs. 5 and 6. The operator will have chosen one or the other scale by turning the knob 73 to elevate the particular cam 81 that corresponds to the scale range desired. The pressure exerted by lever 50 upon the rear end 60 of lever 62 will tend to lift the right hand end of the lever. When this end of the lever lifts, the link 172 will cause the bar 170 to pivot about the fulcrum 173, at the top of the control valve piston shown in Fig. 2. At this time the control valve cannot move because the pilot valve is in a position that prevents the amount of oil in space 158 either being decreased or increased. It follows that as the right hand end of the bar 170 goes up yoke 178 and connector 176 will also move up.

Current was applied to the solenoid 138 when the test is started. This current is automatically interrupted by means not shown when the armature 136 reaches the end of its stroke so that the armature 136 is rapidly oscillating in and out. This causes the bar 134 which is splined, such as by having a square hole fitting a square shaft 132, to turn the valve 120 back and forth through a small angle.

When the yoke moves up the valve 120 also moves up. Thereby a connection is made between the oil under pressure available in line 102 through conduit 130 to space 158. The control valve 149 now starts to move upward at a slow rate determined by the degree that valve 121 uncovered the opening into conduit 192. As the valve 149 moves upwards, the lever 170 now swings about 171 thus bringing the pilot valve 120 back. As the pilot valve comes back the control valve moves more slowly but finally it will have moved far enough to again close pilot valve 106.

The control valve is now in a position to admit oil under pressure from line 104 into line 110 at a fixed rate. This fixed rate will depend upon the position in which the control valve 149 stands and this in turn is dependent upon the amplitude of the upward swing of scale beam pendulum 62.

Oil flowing through line 110 now enters space 112 at the left hand end of the piston. Since that face is larger than the face against space 113, the piston 71 will move to the right the pressure of the oil on the larger face 112 forcing the oil out of space 113 back through line 114. The movement of the piston carries with it the arm 65. Through a link 67 which is preferably placed in the plane of the fulcrum 56 and the center of gravity of the poise 58, the poise is moved toward the right at a uniform rate. At the same time a rack 215 turns a pinion 214 on shaft 213 and this in turn moves the pointer 212 indicating the load on a circular scale. It is obvious that a recording device could be attached either to rod 215 or to shaft 213 and if such a device is so attached, a graphic record of the change in load may be secured. As the poise 58 approaches the point where the scale beam will again balance, the point 171 connected with the end of the scale beam moves downward. Since the control valve is at this time locked in an open position the pilot valve 120 moves downward connecting the conduit 130 with passage 116 back to the sump. As a result the pilot valve moves down, cutting down the rate of flow and slowing up the rate at which the poise moves as the balancing point is approached. When the balancing point is reached, the poise is moving very slowly and it will not appreciably overshoot the balancing point.

Sometimes the load on the specimen 13 changes very rapidly. The resistance of the specimen to compression or tension might have been slight up to a certain point but increased rapidly from there on. As a result the scale beam 62 may suddenly desire to swing up to a position such as that shown in dotted lines at 201 in Fig. 1. In that event, when the scale beam has moved upward a small distance, 184 in Fig. 1, it will contact a finger 202 of lever 190. This finger will back off somewhat compressing the spring 198. The increasing resistance to the movement of the scale beam will bring it to a stop only a short distance above its balancing position.

Since the scale beam has now moved upwards a maximum distance a pilot valve 106 will be opened its maximum distance. As oil flows through line 130 into space 158 the control valve will open, and it will continue to open until it also has opened its maximum distance and shut off the pilot valve. The poise will now be impelled forward at its maximum speed by the piston 71. When the poise is some distance from the balancing point the force of the compressed spring added to the force of the poise will bring the scale beam back down to the point where finger 202 bears against stop 204. The centering movement of the scale beam thus accomplished acting upon the lever 170 in a manner already described, will cause the control valve 180 to cut down the rate of feed of oil into space 112. Thus the poise approaches its balancing position more slowly. We now have the condition first described in which the scale beam is swinging freely within the limits 184 and as the poise continues to approach its balancing point its speed will be further reduced. Even though the poise started out at the speed that might be expected to cause a serious overshooting of the mark its rate of movement is thereby automatically so controlled that it will approach the balancing point without appreciably overshooting the mark.

While in the foregoing description I have described my invention with reference to several specific embodiments and with reference to its application to particular forms of machines having an indicating system of the scale-beam type, it is to be understood that these particular constructional embodiments and applications have been given as illustrative examples only, since various changes and modifications may be made without departing from the spirit of the invention or the scope of the appended claims.

The principle of using a pilot controlling the main controller which regulates the speed of the poise travel, also the principle of limiting the oscillation by restraining elements that still allow a limited free oscillation has been illustrated by a hydraulic control; it could just as well be a pilot resistance controlling the movement of a larger resistance that determines the speed of a motor moving a poise.

It will be obvious for instance, that instead of using the plunger 17 in Fig. 3 for transferring to the lever 50 a load proportional to the fluid pressure existing in the space 11 in a cylinder 6, a chamber communicating with said space 11 and closed by a movable diaphragm could be provided, which diaphragm would operate some member adapted to operate the lever 50. Further, instead of providing differential pistons 70 and 149 as has been described, the return movement of these pistons could be carried out by means of springs, etc.

What I claim is:

1. A load indicating testing machine comprising a scale beam, a poise movable on said scale beam for balancing a load proportional to the load applied to the specimen to be tested, hydraulic means for moving said poise on said scale beam including a cylinder, a piston reciprocatingly arranged in said cylinder and operatively connected to said poise, a pilot valve, a control valve operable by said pilot valve for admitting pressure fluid to said cylinder, the speed of the movement of said poise on said beam being determined by the amount of pressure fluid admitted to said cylinder by said control valve, said pilot valve and said control valve being mechanically connected to each other and to said scale beam so as to impart a wide opening movement to said pilot valve in response to any swing of said scale beam out of its neutral position, while permitting said control valve to be opened hydraulically to a greater or smaller extent commensurate with the larger or smaller instantaneous amplitude of said swing.

2. A load indicating testing machine comprising a scale beam, a poise movable on said scale beam for balancing a load proportional to the load applied to the specimen to be tested, hydraulic means for moving said poise on said scale beam including a cylinder, a piston reciprocatingly arranged in said cylinder and operatively connected to said poise, a pilot valve, a control valve operable by said pilot valve for admitting pressure fluid to said cylinder, the speed of the movement of said poise on said beam being determined by the amount of pressure fluid admitted to said cylinder by said control valve in relation to the varying amplitude of the swing of said beam, said control valve having a differential piston so as to provide a constant hydraulic force tending to move said control valve into a position in which it interrupts the admission of pressure fluid to said cylinder.

3. A load indicating testing machine comprising a scale beam, a poise movable on said scale beam for balancing a load proportional to the load applied to the specimen to be tested, hydraulic means for moving said poise on said scale beam including a cylinder and operatively connected to said poise, a pilot valve, a control valve operable by said pilot valve for admitting pressure fluid to said cylinder, the speed of the movement of said poise on said beam being determined by the amount of pressure fluid admitted to said cylinder by said control valve, said pilot valve and said control valve being mechanically connected to each other and to said scale beam so as to impart a wide opening movement to said pilot valve in response to any swing of said scale beam out of its neutral position while permitting said control valve to be opened hydraulically to a greater or smaller extent commensurate with the larger or smaller instantaneous amplitude of said swing, and said control valve having a differential piston so as to provide a constant hydraulic force tending to return said control valve to the position in which it interrupts the admission of pressure fluid to said cylinder.

4. A load indicating testing machine comprising a scale beam, a poise movable on said scale beam for balancing a load proportional to the load applied to the specimen to be tested, hydraulic means for moving said poise on said scale beam including a cylinder, a piston reciprocatingly arranged in said cylinder, a piston rod attached to said piston and operatively connected to said poise, a pilot valve, a control valve operable by said pilot valve for admitting pressure fluid to said cylinder, the speed of the movement of said poise on said beam being determined by the amount of pressure fluid admitted to said cylinder by said control valve, said pilot valve and said control valve being mechanically connected to each other and to said scale beam so as to impart a wide opening movement to said pilot valve in response to any swing of said scale beam out of its neutral position, while permitting said control valve to be opened hydraulically to a greater or smaller extent commensurate with the larger or smaller instantaneous amplitude of said swing, a housing enclosing said scale beam, said poise and said hydraulic means for moving said poise, a dial and a pointer outside of said housing, and a gear for actuating said pointer, part of this gear being formed by a rack carried by an extension of said piston rod.

5. In combination with a scale beam, a swingable lever adapted to apply load to said beam by bearing against the latter, a plurality of elements carried by said beam at different points of the length thereof, means for moving arbitrarily any desired one of said elements in a plane perpendicular to the lengthwise direction of said beam into contact with said lever, each of said elements being adjustable also lengthwise of said beam.

6. In combination with a scale beam, a swingable lever adapted to apply load to said beam by bearing against the latter, a shaft supported by said beam and extending in the lengthwise direction thereof, a plurality of elements on said shaft having each a peripheral portion extending farther from the axis of said shaft than other portions, and said elements being mounted at different points of the length of the shaft in such a manner that their portions of maximum radius lie in different radial planes and by turning said shaft any desired one of said elements may be brought into supporting contact with said lever.

7. In combination with a scale beam, a swingable lever adapted to apply load to said beam by bearing against the latter, a shaft supported by said beam and extending in the lengthwise direction thereof, a plurality of elements on said shaft having each a peripheral portion extending farther from the axis of said shaft than other portions, and said elements being mounted at different points of the length of said shaft in such a manner that their portions of maximum radius lie in different radial planes and by turning said shaft any desired one of said elements may be brought into supporting contact with said lever, each of said elements being adjustable lengthwise on said shaft.

8. In a testing machine having a load indicating system of the scale-beam type, a scale range changing device comprising means for applying to the scale beam of said load indicating system a load proportional to the load applied to the specimen to be tested, and a plurality of elements mounted on said beam at different distances from the fulcrum thereof together with means for varying the moment determining the length of the load arm of said beam by transferring the point of load application from one to another of said plurality elements.

9. In a testing machine having a load indicating system of the scale-beam type, a scale range changing device comprising means for applying to the scale beam of said load indicating system a load proportional to the load applied to the specimen to be tested, and a plurality of elements carried by said beam together with means for varying the moment determining length of the load arm of said beam by transferring the point of load application from one to another of said plurality of elements, each of said elements being adjustable in the longitudinal direction of said beam.

10. In a testing machine having a load indicating system of the scale beam type, a scale range changing device comprising a swingable lever adapted to apply to the beam of said load indicating system a load proportional to the load applied to the specimen to be tested bearing upon said beam, a shaft supported by said beam and extending in the lengthwise direction thereof, a plurality of elements on said shaft having each a peripheral portion extending farther from the axis of said shaft than other portions and said elements being mounted at different points of the length of said shaft in such a manner that the portion of maximum radius of each element lies in a different radial plane and by turning said shaft any desired of said elements may be brought into supporting contact with said lever.

11. In a testing machine having a load indicating system of the scale beam type, a scale range changing device comprising a swingable lever adapted to apply to the beam of said load indicating system a load proportional to the load applied to the specimen to be tested by bearing upon said beam, a shaft supported by said beam and extending in the lengthwise direction thereof, a plurality of elements on said shaft having each a peripheral portion extending farther from the axis of said shaft than other portions and said elements being mounted at different points of the length of said shaft in such a manner that the portion of maximum radius of each element lies in a different radial plane and by turning said shaft any desired of said elements may be brought into supporting contact with said lever, each of said elements being adjustable lengthwise on said shaft.

12. In a testing machine having a load indicating system of the scale-beam type, a scale range changing device comprising a swingable lever adapted to apply to the beam of said load indicating system a load proportional to the load applied to the specimen to be tested by bearing upon said beam, a shaft supported by said beam and extending in the lengthwise direction thereof, a plurality of circular elements being eccentrically mounted on said shaft at different points of the length thereof in such a manner that the portion of maximum eccentricity of each element lies in a different radial plane so that by turning said shaft any desired of said elements may be brought into supporting contact with said lever.

13. In a testing machine having a load indicating system of the scale-beam type, a scale range changing device comprising a swingable lever adapted to apply to the beam of said load indicating system a load proportional to the load applied to the specimen to be tested by bearing upon said beam, a shaft supported by said beam and extending in the lengthwise direction thereof, a plurality of cams mounted on said shaft at different points of the length thereof in such a manner that the portion of maximum radius of each cam lies in a different radial plane so that by turning said shaft any desired of said cams may be brought into supporting contact with said lever.

14. In a testing machine having a load indicating system of the scale-beam type, a scale range changing device comprising a swingable lever adapted to apply to the beam of said load indicating system a load proportional to the load applied to the specimen to be tested by bearing upon said beam, a shaft supported by said beam and extending in the lengthwise direction thereof, a plurality of circular elements, each formed as a knife edge at its circumference, eccentrically mounted on said shaft at different points of the length thereof in such a manner that the portion of maximum eccentricity of each element lies in a different radial plane so that by turning said shaft the knife edge of any desired of said eccentric elements may be brought into supporting contact with said lever whereas the knife edges of all the other eccentric elements are held out of contact with said lever.

15. In a testing machine having a load indicating system of the scale-beam type, a scale range changing device comprising a swingable lever adapted to apply to the beam of said load indicating system a load proportional to the load applied to the specimen to be tested by bearing upon said beam, a shaft supported by said beam and extending in the lengthwise direction thereof, a plurality of cams, each formed as a knife edge at its circumference, mounted on said shaft at different points of the length thereof in such a manner that the portion of maximum radius of each cam lies in a different radial plane so that by turning said shaft the knife edge of any desired of said cams may be brought into supporting contact with said lever whereas the knife edges of all the other cams are held out of contact with said lever.

16. In a testing machine in which the load is applied to the specimen to be tested by means of hydraulic pressure produced in a cylinder and the load indicating system is of the scale-beam type, a member movable under the action of hydraulic pressure derived from said cylinder, a swingable lever operable by said member and bearing against the beam of said load indicating system so as to apply to said beam a load proportional to the load applied to the specimen to be tested, a poise on said beam, and means for moving said poise on said beam at a variable speed controlled by means responsive to variations in the degree of unbalance of said beam.

17. In a testing machine in which the load is applied to the specimen to be tested by means of hydraulic pressure produced in a cylinder and the load indicating system is of the scale-beam type, a member movable under the action of hydraulic pressure derived from said cylinder, a swingable lever operable by said member and bearing against the beam of said load indicating system so as to apply to said beam a load proportional to the load applied to the specimen to be tested, a poise on said beam, and hydraulic means for moving said poise on said beam at a variable speed controlled by hydraulic means responsive to variations in the degree of unbalance of said beam.

18. A load indicating testing machine comprising a scale beam, a poise movable on said scale beam for balancing a load proportional to the load applied to the specimen to be tested, means for moving said poise on said scale beam at a variable speed controlled by hydraulic means including a pilot valve and a control valve, each having a movable valve piston, said pilot valve being constructed to open in response to any swing of said scale beam out of its neutral position while becoming closed upon said control valve having opened to an extent commensurate with the larger or smaller instantaneous amplitude of said swing, and means for oscillating said valve piston of said pilot valve about its axis at a rapid rate.

19. A load indicating testing machine comprising a scale beam, a poise movable on said scale beam for balancing a load proportional to the load applied to the specimen to be tested, hydraulic means for moving said poise on said scale beam including a cylinder reciprocatingly arranged in said cylinder and operatively connected to said poise, a pilot valve, a control valve operable by said pilot valve for admitting pressure fluid to said cylinder, the speed of the movement of said poise on said beam being determined by the amount of pressure fluid admitted to said cylinder by said control valve, said pilot valve and said control valve having each a movable valve piston, a lever system connecting said valve pistons to each other and to said scale beam so as to impart an opening movement to the valve piston of said pilot valve in response to any swing of said scale beam out of its neutral position, while permitting said control valve to be opened hydraulically to a greater or smaller extent commensurate with the larger or smaller instantaneous amplitude of said swing, and means for oscillating said valve piston of said pilot valve about its axis at a rapid rate.

20. A load indicating testing machine comprising a scale beam, a poise movable on said scale beam for balancing a load proportional to the load applied to the specimen to be tested, hydraulic means for moving said poise on said scale beam including a cylinder, a piston reciprocatingly arranged in said cylinder and operatively connected to said poise, a pilot valve, a control valve operable by said pilot valve for admitting pressure fluid to said cylinder, the speed of the movement of said poise on said beam being determined by the amount of pressure fluid admitted to said cylinder by said control valve, said pilot valve and said control valve having each a movable valve piston, a lever system connecting said valve pistons to each other and to said scale beam so as to impart an opening movement to said pilot valve in response to any swing of said scale beam out of its neutral position, while permitting said control valve to be opened hydraulically to a greater or smaller extent commensurate with the larger or smaller instantaneous amplitude of said swing, means for oscillating said valve piston of said pilot valve about its axis at a rapid rate, and coupling means inserted into the connection between said oscillating piston and said lever system permitting said pilot valve piston to follow movements of said lever system without transferring the oscillating movements of said pilot valve piston to said lever system.

21. A load-indicating testing machine comprising a scale beam, a poise movable on said scale beam to balance a load that is proportional to the varying load applied to the specimen to be tested, means for moving said poise along said scale beam and means causing said last-named means to move the poise toward the balanced position of the beam at a rate determined by the divergence of said beam from its balanced position at any instant.

22. A load-indicating testing machine comprising a scale beam, a poise movable on said scale beam to balance a load that is proportional to the varying load applied to the specimen to be tested, hydraulic means for moving said poise along said scale beam, and hydraulic control means causing said last-named means to move the poise toward the balanced position of the beam at a rate determined by the divergence of said beam from its balanced position at any instant.

23. A load-indicating testing machine comprising a scale beam, a poise movable on said scale beam to balance a load that is proportional to the varying load applied to the specimen to be tested, means for moving said poise along said scale beam and means causing said last-named means to move the poise toward the balanced position of the beam at a rate determined by the divergence of said beam from its balanced position at any instant and resilient means adapted to assist the poise in balancing the load by supplying a restoring force, which increases with the divergence of the beam from its balanced position, said resilient means being engaged by the scale beam only after the scale beam reaches the limits of a range within which it can oscillate unrestrainedly.

24. A load-indicating testing machine comprising a scale beam, a poise movable on said scale beam for balancing a load transmitted to the scale beam that is proportional to the load applied to a specimen to be tested, hydraulic means for moving said poise along said scale beam including a cylinder, a piston in said cylinder operatively connected to said poise, a control valve determining the rate at which liquid flows into the cylinder, a plunger adapted to progressively open the control valve, a pilot valve actuated by the scale beam and a conduit from the pilot valve to the plunger to progressively open the control valve while the scale beam remains out of balance.

25. A load-indicating testing machine comprising a scale beam, a poise movable on said scale beam for balancing a load transmitted to the scale beam that is proportional to the load applied to a specimen to be tested, hydraulic means for moving said poise along said scale beam including a cylinder, a piston in said cylinder operatively connected to said poise, a control valve determining the rate at which liquid flows into the cylinder, a plunger adapted to progressively open the control valve, a pilot valve actuated by the scale beam, a conduit from the pilot valve to the plunger to progressively open the control valve while the scale beam remains out of balance, a pinion-controlled pointer and a rack moved by the piston engaging the pinion to give a dial reading corresponding to the poise position on the scale.

26. In a testing machine wherein the load on a specimen is indicated by the position of the poise relative to a scale on the scale beam, in combination, a housing, means for applying a load to the specimen, a pivoted arm supported by the housing, means for transferring a predetermined part of the load applied to the specimen to the pivoted arm, a scale beam having an arm extending alongside of the pivoted arm, a plurality of knife edges spaced along said arm of the scale beam, the other arm of the scale beam being provided with scales of different ranges, a poise movable on said other arm to balance the scale beam the position of the poise being readable on the scales, means permitting the selection of any one of said knife edges to transmit the load from the specimen through the pivoted lever to the scale beam thereby changing the scale which indicates the load on the specimen.

27. A load-indicating testing machine comprising a scale beam, a poise movable along asid scale beam for balancing a load which is proportional to the stress applied to the specimen being tested, hydraulic means for moving said poise along said scale beam including a cylinder, a piston in said cylinder operatively connected to said poise, a two-way hydraulically operated control valve adapted to add or withdraw liquid from the cylinder, a two-way pilot valve operated by the beam to deliver fluid to move the control valve to such an extent and direction that it will deliver or withdraw liquid from the cylinder at a rate proportional to the extent of swing of the scale beam to cause the piston to move the poise in the direction to reduce the swing of the beam.

28. A load-indicating testing machine comprising a scale beam, a poise movable along said scale beam for balancing a load which is proportional to the stress applied to the specimen being tested, hydraulic means for moving said poise along said scale beam including a cylinder, a piston in said cylinder operatively connected to said poise, a two-way hydraulically operated control valve adapted to add or withdraw liquid from the cylinder, a two-way pilot valve operated by the beam to deliver fluid to move the control valve to such an extent and direction that it will deliver or withdraw liquid from the cylinder at a rate proportional to the extent of swing of the scale beam to cause the piston to move the poise in the direction to reduce the swing of the beam, means to progressively close the pilot valve as the control valve is opened by the pilot valve.

29. In a load balancing device, in combination, a lever having a horizontal fulcrum, means for applying a vertical load to said lever at a fixed distance from said fulcrum, a second fulcrum parallel to the first fulcrum and horizontally spaced therefrom, an arm pivoted on said axis movable in the vertical plane of said lever, a plurality of devices spaced at fixed intervals between the fulcra and movable in a plane parallel thereto, each device being so designed that any selected device may transmit a force from the lever to the arm, means for selectively moving one of said devices into position between the lever and the arm, and means connected with the arm for balancing the force transmitted through said selected device.

30. A testing machine adapted to indicate the load applied to a specimen comprising, in combination, a scale beam free to swing above and below its balanced position, a frame supporting the beam, stops on the frame spaced from the free end of the beam, mechanism for loading the scale beam in a fixed ratio to the stress applied to a specimen being tested, a poise movable on the scale beam to balance the beam, a first resilient means carried by the scale beam which engages one of said stops after the free end of the scale beam has moved through a predetermined distance from its balanced position and which is increasingly stressed by the further movement of the scale beam relative to the stop and thereby opposes the swing of the scale beam with increasing force, a second means less resilient than the first carried by the scale beam which engages another stop after the free end of the scale beam has moved through a fixed distance larger than the predetermined distance so that further movement of the scale beam is resisted by the force required to increasingly stress each of said two resilient means.

31. In a load-balancing device, in combination, two generally parallel levers movable in a vertical plane, a horizontal fulcrum about which the first lever pivots, a second fulcrum horizontally spaced from said first fulcrum about which the second lever pivots, a plurality of devices each movable in its own plane located at a fixed interval in the distance between the two fulcra, means for moving any one of said devices into position within its own plane to transmit pressure from the first to the second lever, means for applying a load to be measured to the first lever, means connected with the second lever for balancing said load through said selected device.

32. In a testing machine having parallel scales each of which is adapted for indicating loads in making tests within a different load range, in combination, means for exerting a large force on a specimen, a lever balanced on a fulcrum, means exerting a stress proportionate to the large force exerted on the specimen upon one arm of the lever, other means creating a small force acting upon the other arm of said lever, means for changing the ratio which the lever arm on which the small force acts bears to the lever arm on which said stress acts, means for measuring the small force having an indicator moving a distance proportionate to the size of said force, and a plurality of scales in operative relation to said indicator and each calibrated to permit the indicator to indicate the size of the large load which is balanced by the small force when the corresponding lever arm ratio has been chosen.

FRANCIS C. HUYSER.

REFERENCES CITED

The following references are of record in the file of this patent:

UNITED STATES PATENTS

| Number | Name | Date |
| --- | --- | --- |
| 493,784 | Reeser | Mar. 21, 1893 |
| 1,484,358 | Norton | Feb. 19, 1924 |
| 1,952,171 | Jones | Mar. 27, 1934 |
| 2,068,565 | Okey | Jan. 19, 1937 |
| 2,073,445 | De Jongh | Mar. 9, 1937 |
| 2,075,968 | Von Heydekampf | Apr. 6, 1937 |
| 2,126,157 | Von Thungen | Aug. 9, 1938 |
| 2,190,506 | Wurr | Feb. 13, 1940 |
| 2,222,140 | De Jongh | Nov. 19, 1940 |
| 2,313,509 | Bohannan | Mar. 9, 1943 |

FOREIGN PATENTS

| Number | Country | Date |
| --- | --- | --- |
| 16,763 | Great Britain | 1886 |